Oct. 26, 1943.   W. E. JOHNSON   2,332,916
INTERNAL COMBUSTION ENGINE ARRANGEMENT
Filed Aug. 26, 1942
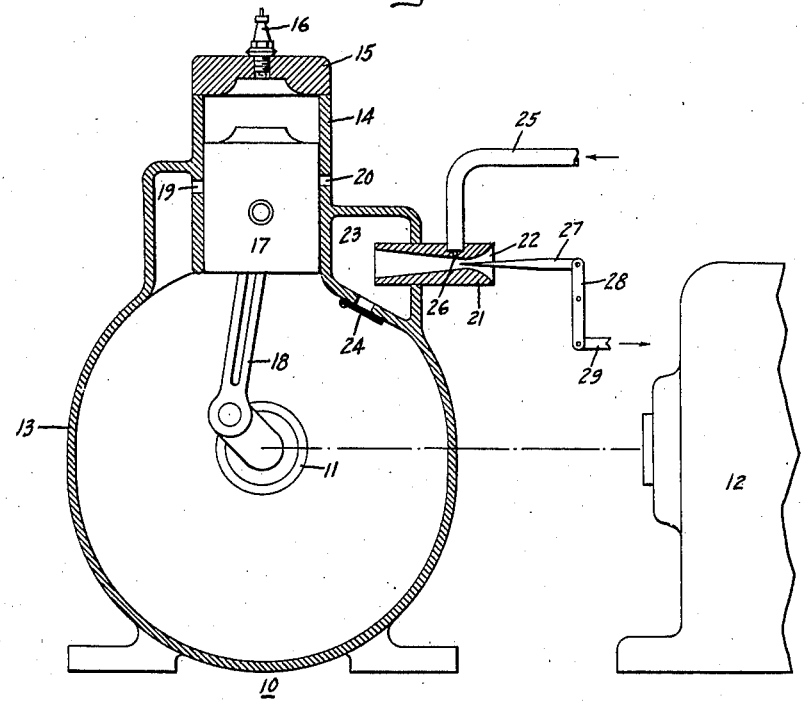
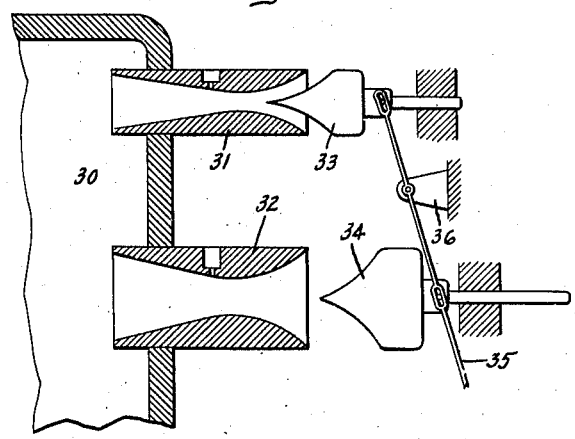
Inventor:
Wilfrid E. Johnson,
by Harry E. Dunham
His Attorney.

Patented Oct. 26, 1943

2,332,916

UNITED STATES PATENT OFFICE 2,332,916

INTERNAL COMBUSTION ENGINE ARRANGEMENT

Wilfrid E. Johnson, Marblehead, Mass., assignor to General Electric Company, a corporation of New York Application August 26, 1942, Serial No. 456,176

6 Claims. (Cl. 123—73)

The present invention relates to internal combustion engine arrangements and is of particular interest in connection with two-cycle internal combustion engines although it is not necessarily limited thereto. In certain cases where the load requirement of an internal combustion engine is substantially constant or varies within a small range, for example a range of the order of 10 per cent, it has heretofore been the practice to provide complicated and expensive engine control mechanisms to vary the supply of operating medium to the engine in response to speed changes of the engines or other indications of load variation in order to maintain the speed substantially constant.

One object of my invention is to provide an improved combustion engine arrangement in which the speed of a combustion engine is maintained within a narrow range for a given load output without the provision of a particular speed-governing mechanism. This is accomplished in accordance with my invention by the provision of means for conducting operating medium such as a mixture of fuel and air to the engine, which means includes a Venturi tube designed to cause the medium flowing therethrough to attain sonic velocity at the required engine load output. Thus, if an engine according to my invention is required to furnish a load output of 100 kw., I provide the engine with a venturi for conducting air and fuel to an inlet chamber of the engine, which venturi is designed to produce sound velocity of the air flowing therethrough at the required load output of 100 kw. The sonic velocity of the medium flowing through the neck of the venturi constitutes a definite limitation of the weight-flow per minute of air through the venturi. Once sonic velocity is reached in the venturi a further increase of the flow therethrough becomes impossible, irrespective of changes in engine speed which may occur. Thus, once sonic velocity is attained in the venturi, a change in speed will only affect the charge of air and fuel delivered to an engine cylinder per stroke. The amount of fuel and air per stroke then will decrease with increasing engine speed and, vice versa, the charge per stroke will increase with decreasing engine speed. The variation of the charge per stroke upon changes of speed of the engine acts to control the speed within fairly narrow limits. If at a speed which first produces sonic velocity in the venturi the engine torque is 10 per cent in excess of that required, the speed of the engine will increase 10 per cent, causing a corresponding decrease in torque to balance the load. This action, however, is possible only as long as the air flows at sound velocity through the narrow portion of the venturi. At velocities below that of sound in the venturi, at which velocities ordinary engines of this type are operated, a change in engine speed causes a change in pressure in the inlet chamber and consequently a change in pressure drop and as a result thereof a change in flow. With my invention as pointed out above the flow will remain constant because the change in pressure drop does not affect the flow at sonic velocity in the venturi.

In the accompanying drawing I have shown in Fig. 1 a diagrammatic view of an embodiment of my invention, and in Fig. 2 a modification of a part of Fig. 1.

The arrangement of Fig. 1 comprises a two-cycle internal combustion engine 10 having a crank shaft 11 arranged to drive a machine 12 which may be a pump, a generator, or the like normally requiring a substantially constant load input. The two-cycle combustion engine 10 has a crank casing 13 which also constitutes a compression chamber 13. An upper portion of the casing 13 is integrally united with a cylinder 14 having a detachable cover 15 with a spark plug 16. A piston 17 movably disposed in the cylinder 14 is connected by a rod 18 to the crank shaft 11. The cylinder 14 has an inlet port 19 communicating with the crank casing or compression chamber 13 for receiving a mixture of fuel and air, and an outlet or exhaust port 20 for discharging burned gases from the cylinder to atmosphere. Fuel and air are supplied to the engine by means including a venturi 21 having an inlet opening 22 for receiving air and an outlet projecting into a receiving chamber 23 formed by the engine casing and communicating with the compression chamber 13 through nonreturn valve 24. Fuel is conducted to the venturi 21 by a pipe 25 connected to a port 26 in the venturi at a point beyond the throat of the venturi as regards the direction of flow therethrough.

During operation the fuel and the air passed through the venturi are mixed in the chamber 23 and from there drawn into the compression chamber 13 during the upward stroke of the piston 17. Downward movement of the piston 17 causes compression of the mixture in the chamber 13 and as the piston 17 moves down beyond the port 19 the compressed mixture of air and fuel is forced through the port 19 into the cylinder to be burned therein and after expansion to be discharged through the outlet port 20.

As explained above, the venturi 21 according to my invention is designed to cause the air supplied therethrough to attain sonic velocity at the required load output of the engine. With such an arrangement the engine becomes self-controlling without the provision of particular governing mechanisms because a change in speed due to a variation in load causing a change in inlet pressure in the chamber 23 does not affect the flow through the venturi 21. The weight-flow per minute of air conducted through the venturi remains substantially constant.

If it is desired to operate an engine according to my invention at different load outputs and to keep the speed for each particular output within narrow limits, this may be readily accomplished by the provision of means to control the effective throat area of the venturi 21. In the present example I have shown a needle valve member 27 projecting into the throat of the venturi 21 and pivotally connected to one end of a fulcrum lever 28, the other end of which is pivotally connected to a control lever 29. According to my invention upon change in load requirement from the engine 10 the valve 27 is positioned in the venturi throat until the air-flow therethrough attains sonic velocity at the required engine load output. Thus, if only half of the normal load is required from the engine 10 the needle valve 27 is moved into the throat to reduce the effective throat area until the air-flow therethrough reaches sonic velocity at half engine load output. Thus, my invention comprises a new method of operating and controlling internal combustion engines subject to varying load demand according to which the effective throat area of a nozzle such as a Venturi tube is varied upon changes in load demand to maintain the velocity of the medium at sound velocity in the throat area for each load. As a result of such operation the speed of the engine is automatically held within a comparatively narrow range of say about 10 per cent without requiring the provision of a special speed-controlling mechanism.

Fig. 2 shows another arrangement for varying the flow to a reception chamber to satisfy different load requirements. The arrangement includes an inlet chamber 30 corresponding to the chamber 23 of Fig. 1 and a plurality of venturis 31, 32 connected thereto. The flow through the venturis may be controlled by movable valve members 33 and 34 respectively, pivotally connected to a lever 35 on opposite sides from a fulcrum 36 for supporting the lever 35 on a wall. Turning movement of the lever 35 in clockwise direction about the fulcrum 36 causes opening of the small venturi 31 and closing of the larger venturi 32 and vice versa. During low load requirements the engine is operated by means of the venturi 31 and during high load requirements the engine is operated by the larger venturi 32 or by both venturis 31 and 32. In the position shown the valve members 33, 34 are both in substantially fully open position, permitting maximum load output of the engine as determined by the maximum flow through both venturis 31, 32 at sound velocity. Upon decreased load requirement the lever 35 may be turned counterclockwise until in an end position the venturi 31 is completely closed in which portion the load output is limited by the maximum flow through the larger venturi 32. If the load demand should drop further, the lever 35 will be turned clockwise to open the venturi and to reduce the effective area through the venturi 32 until in an end position the venturi 32 is completely closed and the flow is reduced to a minimum by the venturi 31. With this arrangement the engine may be controlled to hold any load within a relatively narrow speed range between the minimum and maximum possible loads fixed by the throat area of the small venturi 31 and the total throat area of both venturis 31 and 32 respectively.

What I claim as new and desire to secure by Letters Patent of the United States is:

1. In an internal combustion engine for operation at loads varying within a small range only, a combustion chamber, and the combination of a Venturi tube for conducting operating medium thereto, the tube being designed with a throat area in which the operating medium attains sound velocity at the normal load output of the engine in order to maintain the engine speed range within narrow limits upon slight variations of the load output in the absence of a speed-governing agency.

2. In an internal combustion engine a combustion chamber, and the combination of a Venturi tube for conducting combustion air thereto, said tube having an effective throat area dimensioned to cause the normal air-flow therethrough to attain sound velocity at the required load output of the engine automatically to limit the speed range upon variations in load and to permit operation of the engine without a special load and speed governing device.

3. In a two-cycle combustion engine the combination of a chamber for receiving a mixture of fuel and air, and means for conducting air to the chamber including a venturi having a throat area dimensioned to cause the air-flow therethrough to attain sound velocity at the maximum load output required from the engine in order to prevent increase in flow through the venturi upon decrease in load demand, and means for varying the effective throat area of the venturi to cause the air-flow therethrough to attain sonic velocity upon decrease in load demand from the engine.

4. In an internal combustion engine the combination of a chamber for receiving a mixture of fuel and air, and means for conducting air to the chamber including a plurality of venturis connected in parallel to the chamber, said venturis having a total throat area dimensioned to cause the air-flow therethrough to attain sound velocity for a maximum load output requirement of the engine.

5. In an internal combustion engine the combination of a chamber for receiving a mixture of fuel and air, and means for conducting air to the chamber including a plurality of venturis connected in parallel to the chamber, said venturis having a total throat area dimensioned to cause the air-flow therethrough to attain sound velocity for a maximum load output requirement of the engine, and means to vary the effective throat area of at least one of the venturis to permit operation of the engine under varying load requirements at sound velocity of the operating medium through the venturis for each particular load requirement.

6. The method of operating an internal combustion engine having a combustion chamber and venturi means with an adjustable throat area through which air is supplied to the chamber, which method comprises adjusting the throat area to maintain air-flow therethrough at sonic velocity upon changes of load demand from the engine.

WILFRID E. JOHNSON.